United States Patent [19]

Wagenführer et al.

[11] 3,857,463
[45] Dec. 31, 1974

[54] ARRANGEMENT FOR THE DOSING AND DISTRIBUTION OF FOOD

[75] Inventors: Günter Wagenführer; Bruno Hartmann; Hans-Werner Rothmann, all of Gelsenkirchen, Germany

[73] Assignee: F. Kuppersbusch & Sohne AG, Gelsenkirchen, Germany

[22] Filed: Sept. 7, 1973

[21] Appl. No.: 395,258

[30] Foreign Application Priority Data
Aug. 12, 1972 Germany............................ 2239722
Aug. 12, 1972 Germany............................ 7229898

[52] U.S. Cl.................................................. 186/1 R
[51] Int. Cl................................................. E04h 3/04
[58] Field of Search.......................... 214/1 R, 1 D; 198/78–81, 103, 105

[56] References Cited
UNITED STATES PATENTS

| | | | |
|---|---|---|---|
| 3,298,461 | 1/1967 | Kinkaid.............................. | 186/1 R |
| 3,370,720 | 2/1968 | Schickle............................ | 198/80 X |
| 3,453,659 | 7/1969 | Beecher et al..................... | 186/1 R |
| 3,464,363 | 9/1969 | Wishart............................. | 186/1 R X |
| 3,641,263 | 2/1972 | Rhoads et al.................... | 186/1 R X |

*Primary Examiner*—Frank E. Werner
*Attorney, Agent, or Firm*—Spencer & Kaye

[57] ABSTRACT

In a food dosing and distributing arrangement forming part of a large-scale food preparing system that includes a loading station where transportable food containers are charged with food, a dosing station where food trays are charged with predetermined food portions from the food containers and a food outlet station to which the loaded food trays are admitted in succession from the dosing station, there is provided, between the loading station and the dosing station, a first conveyor forming an accumulation path for the filled food containers, a second, or distributor conveyor receiving the filled containers from the accumulation path and a third conveyor receiving the filled containers from the distributor conveyor and carrying them to the dosing station. There is further provided a fourth conveyor for carrying to the food outlet station food trays filled in the dosing station. At the latter there is provided a mechanical accumulation system for the filled food containers, and at the fourth conveyor there are provided a tray feeding mechanism and a synchronizing mechanism operatively connected with the food outlet station.

9 Claims, 2 Drawing Figures

ARRANGEMENT FOR THE DOSING AND DISTRIBUTION OF FOOD

BACKGROUND OF THE INVENTION

This invention relates to an arrangement for the dosing and distribution of food and finds particular use in large-capacity kitchens. The arrangement is of the type in which transportable food containers are filled with food in at least one loading station and the filled food containers are admitted to at least one dosing station where food trays are charged with food portions from the food containers and are advanced to at least one food outlet station.

Arrangements are known wherein the food is loaded in the kitchen in transportable containers which are advanced to a dosing station. Subsequent to providing trays with the proper food dosage, the trays are forwarded on a conveyor belt to a food outlet station. These known arrangements require a substantial amount of labor input and are further disadvantageous in that the operation lacks efficiency.

SUMMARY OF THE INVENTION

It is an object of the invention to provide an arrangement of the afore-outlined type which has a high throughput and which substantially reduces manual labor.

This object and others to become apparent as the specification progresses, are accomplished by the invention, according to which, briefly stated, between a loading station where the transportable food containers are charged with food and the dosing station where food trays are charged with predetermined food portions taken from the food containers, there is provided for the containers an accumulation path which, by means of a distributor conveyor, is connected with a further conveyor leading to the dosing station. Further, the dosing station is connected by means of still another conveyor to a continuously moved multi-zone food outlet station. At the dosing station there is provided a mechanical accummulation system for the food containers and at the conveyor leading to the food outlet station there are provided a tray feeding mechanism and a synchronizing mechanism operatively connected with the food outlet station.

The arrangement according to the invention is advantageous in that there is provided a fully mechanized transportation of the filled food containers to the dosing stations and that manual labor is required only at the dosing stations. Further, the timed feed of the food trays to the food outlet stations is also effected automatically. Compared with the arrangements known heretofore, in addition to a higher throughput there is obtained a labor saving of up to 50 percent. Further, the filled food containers are, by virtue of the invention, available in sufficient quantities since the control of the admission thereof to the individual dosing stations is effected automatically.

According to a further development of the invention, it is advantageous to provide between the distributor conveyor and the conveyor leading to the dosing station, an extensible conveyor by means of which the food containers may be forwarded as needed.

The feed of empty food trays to the conveyor which leads to the food outlet station through the dosing station, is effected expediently by means of a feeding chute through which the empty food trays are deposited on the conveyor. The food trays then pass by the dosing station on the conveyor belt where they are charged with food portions. The introduction of the loaded food trays to the continuously moving food outlet stations is effected by a synchronizing mechanism. The food outlet stations are each expediently formed as a rotary multi-zone slide platform for receiving the food trays.

DESCRIPTION OF THE PREFERRED EMBODIMENTS

Figure 1:
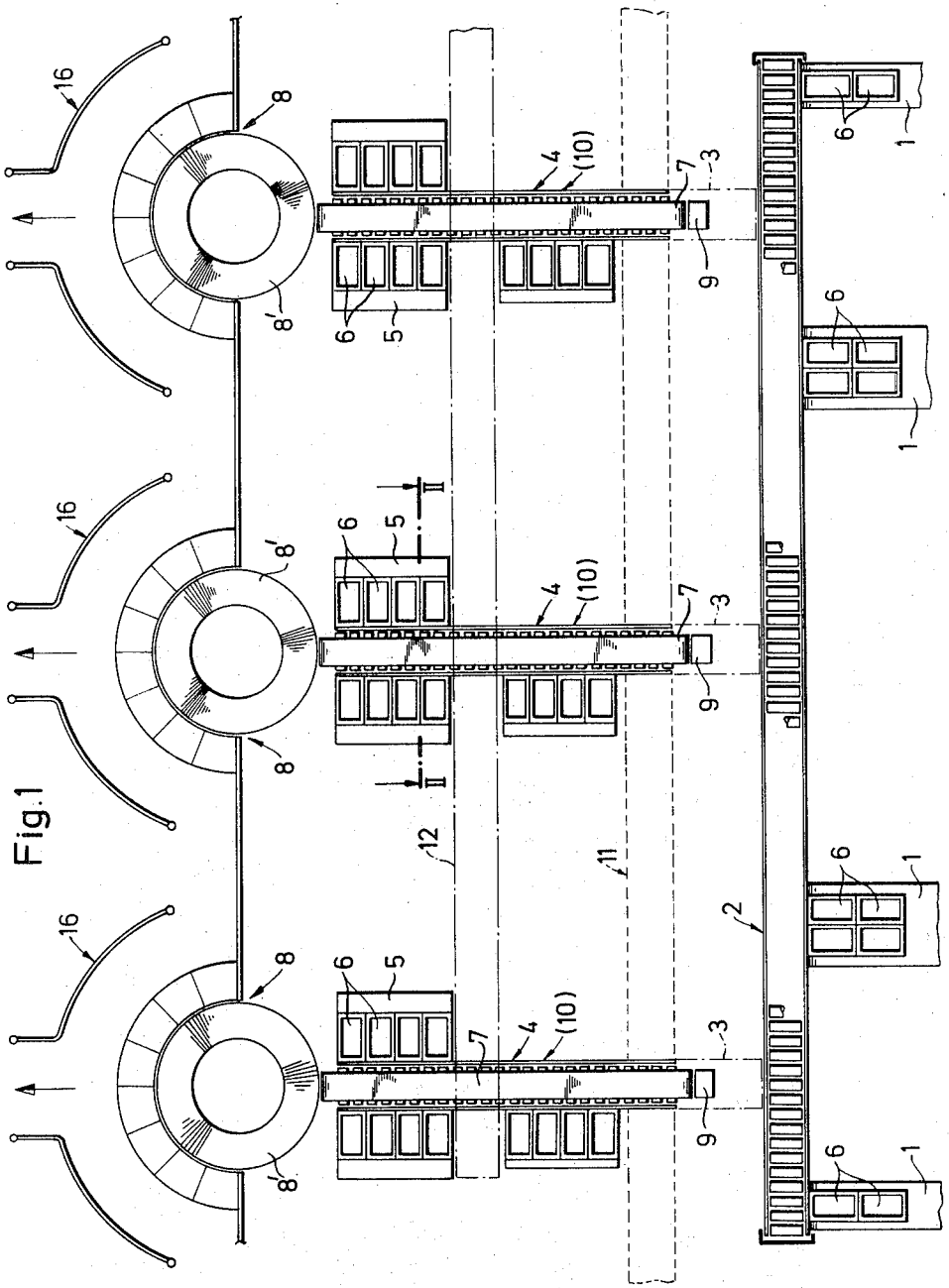
FIG. 1 is a schematic plan view of a preferred embodiment of the arrangement according to the invention.

Turning first to FIG. 1, there are illustrated several parallel-arranged conveyors, each forming an accumulation path 1 for the loaded food containers 6. The accumulation paths are coupled to a roller-type distributor conveyor 2. The latter, for distributing the food containers 6 from the accumulation paths may be connected by means of a longitudinally extensible roller path 3 to parallel-arranged roller chain conveyors 4, each transporting the food containers 6 to an associated dosing station 5. The control of the food containers 6 on the accumulation paths 1 and thus the feed thereof to the dosing stations 5 are effected by an electromechanical gating and sensor system (not shown). The latter operates in such a manner that by means of linkage levers and cables, food containers may be forwarded from the accumulation path 1 as needed. The food containers 6 then run on the driven distributor conveyor 2 and the roller chain conveyors 4 to the individual dosing stations 5. From each roller chain conveyor 4 the food container 6 is pulled off to the associated dosing station 5. The motion of each food container 6 always occurs in the same plane so that none of the food containers has to be lifted or carried by personnel. At each dosing station 5, under the food container 6, there is provided a heater 14 for maintaining the food hot in the containers 6.

Figure 2:
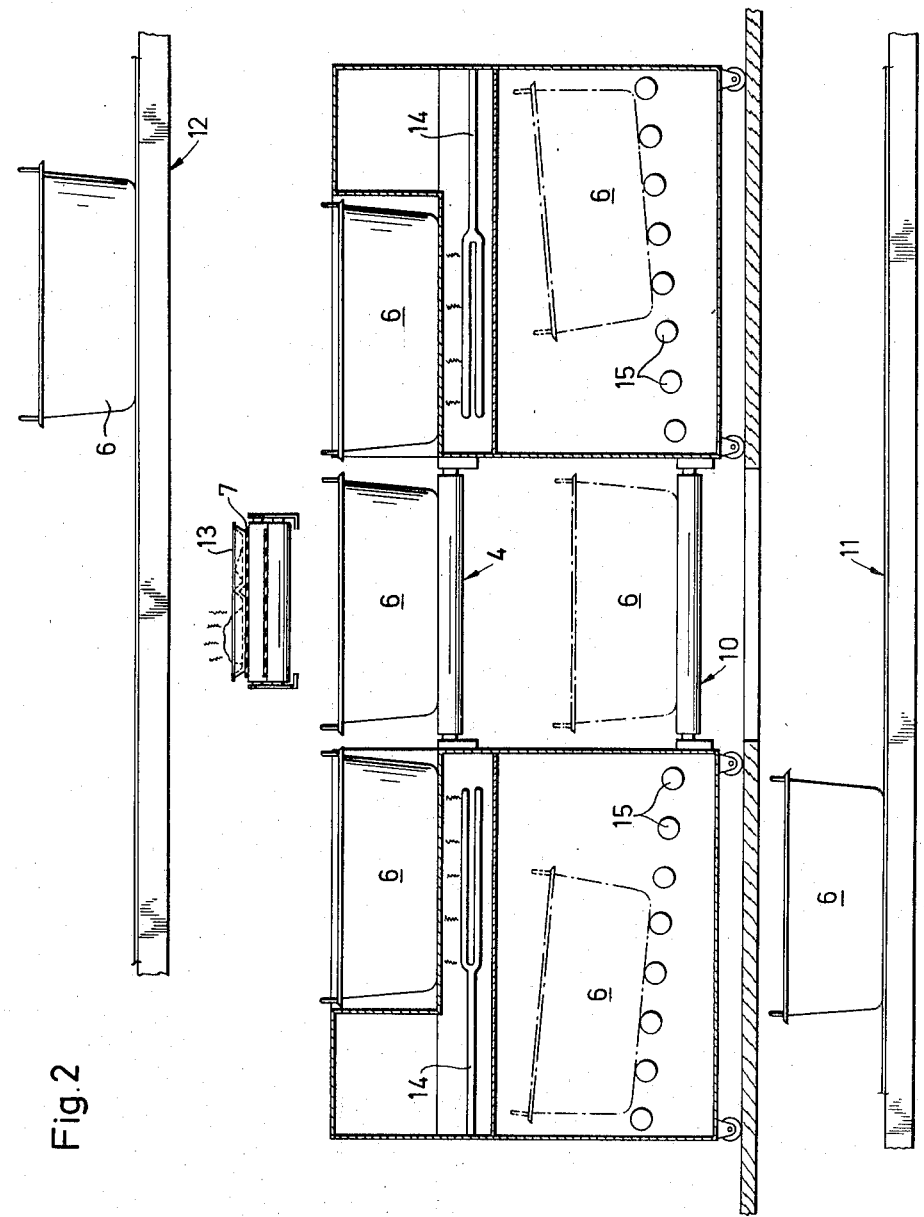
FIG. 2 is a side elevational sectional view of a dosing station taken along line II—II of FIG. 1.

As best illustrated in FIG. 2, above each roller chain conveyor 4 there is positioned a conveyor belt 7 which passes by the associated dosing station 5 and which leads to an associated food outlet station 8. The walk way to each food outlet station 8 is bounded by a railing 16. The empty food trays 13 are advanced to the conveyor belt 7 by means of a chute 9 or a drop shaft. Then the trays 13 are, by means of a carrying mechanism (not shown) attached to the conveyor 7, passed by the associated dosing station 5. At the latter the food trays 13 are charged manually with the individual food stuff from the food containers 6 and are, at the downstream end of the conveyor belt 7, introduced to the food outlet station 8 in a synchronous manner. Each food outlet station 8 comprises a rotating circular slide platform 8'. By virtue of the rotary motion of the latter, food trays 13 may be fed continuously to the food outlet station 8. An electromechanical gating and sensor system (not shown) operatively connected with the platform 8' provides that in case one or more food trays 13 are not removed by consumers from the food outlet station 8, further introduction of food trays from the conveyor 7 to the already occupied zone of the sliding platform 8' is suspended so that the food trays will not pile up on the platform 8'. This gating and sensor system may comprise a gate which is movable into and out of the traveling path of the trays 13 on the platform 8' and on which there is mounted a limit switch. During the automatic feed of the food trays 13 onto the rotatable slide platform 8', the gate is moved into its engageable position. In case a food tray remains on the rotating platform 8' as the zone occupied by such a tray returns to the downstream or feeding end of the conveyor 7, the limit switch at the gate is activated by the tray and effects a stoppage of the conveyor belt 7 upon termination of its previous feed motion. At the same time, the food tray that has remained on the rotary platform 8' passes by the conveyor belt 7. Subsequent to this occurrence the gate is again moved into position and the conveyor belt is again set into motion. In case several food trays 13 remain unremoved and are recirculated on the platform 8', the conveyor belt 7 is set in motion only when an empty zone of the slide platform 8' appears at the downstream end of the conveyor 7.

The advance of the individual food trays 13 on and with the conveyor belt 7 is effected, for example, by means of cleats bonded to the conveyor.

The reconveyance of the empty food containers 6 is effected through a downwardly inclined roller-type conveyor 15 which discharges onto a normally extending roller chain conveyor 10. The latter is coupled through a chute to a reconveying belt 11 disposed under the dosing stations 5 and running transversely thereto. The reconveying of the food containers 6 may also be effected by a reconveying belt 12 that is disposed above the dosing stations 5. By means of the reconveying belts 11 and/or 12 the empty food containers 6 are taken back to a rinsing and cleaning station.

It will be understood that the above discription of the present invention is susceptible to various modifications, changes and adaptations, and the same are intended to be comprehended within the meaning and range of equivalents of the appended claims.

We claim:

1. An arrangement for the dosing and distribution of food forming part of a large-scale food preparing system which has at least one loading station where transportable containers are charged with food, at least one dosing station where food trays are charged with a predetermined portion of food taken from the food containers, and at least one food outlet station to which the filled food trays are introduced from the dosing station, comprising in combination:
   a. a first conveyor means defining at least one accumulation path for the filled food containers and being disposed between said loading station and said dosing station;
   b. a second distributor conveyor means situated adjacent said accumulation path for receiving said filled food containers therefrom;
   c. a third conveyor means extending from said second conveyor means to said dosing station for receiving said filled food containers from said second conveyor means and carrying them to said dosing station;
   d. a fourth conveyor means extending through said dosing station to said food outlet station for carrying food trays filled in said dosing station to said food outlet station;
   e. a multi-zone movable means forming part of said food outlet station for receiving in each successive zone thereof, a filled food tray from said fourth conveyor means;
   f. a mechanical accumulation system for said loaded food containers, arranged at said dosing station;
   g. a tray feeding device arranged at said fourth conveyor means for introducing said filled food trays from said fourth conveyor means to said food outlet station; and
   h. a synchronizing mechanism arranged at said fourth conveyor means and associated with said food outlet station.

2. An arrangement as defined in claim 1, including at least one fifth, extensible conveyor means connecting said second conveyor means with said third conveyor means.

3. An arrangement as defined in claim 1, including chute means operatively connected to said fourth conveyor means for depositing thereon is succession empty food trays carried to said dosing station.

4. An arrangement as defined in claim 1, wherein said multi-zone movable means is formed as a rotating slide platform for receiving in succession the loaded food trays.

5. An arrangement as defined in claim 1, including a synchronizing means operatively connected to said food outlet station, said synchronizing means including a limit switch disposed in the path of the filled food trays on said multi-zone movable means to be engaged by a filled food tray that is recirculated on said movable means, said limit switch is connected to said fourth conveyor means to stop the latter as long as zones of said multi-zone movable means already occupied by a loaded food tray are brought into alignment with said fourth conveyor means.

6. An arrangement as defined in claim 5, including a gate movable into and out of the path of the filled food trays on said multi-zone movable means, said gate accumulating the recirculated filled food trays on said movable means for rendering the empty zones on said movable means consecutive for permitting a simultaneous charging of the food outlet station from said fourth conveyor means.

7. An arrangement as defined in claim 1, including a rinsing station and a fifth conveyor means extending from said dosing station to said rinsing station for reconveying to the latter empty food containers from said dosing station.

8. An arrangement as defined in claim 7, wherein said fifth conveyor means is situated below said dosing station.

9. An arrangement as defined in claim 7, wherein said fifth conveyor means is situated above said dosing station.

* * * * *